United States Patent
Bunnell

(10) Patent No.: US 7,104,209 B1
(45) Date of Patent: Sep. 12, 2006

(54) HYBRIDHULL BOAT SYSTEM

(76) Inventor: Alicia A. Bunnell, 3977 NW. Willow Creek Dr., Jensen Beach, FL (US) 34957

( * ) Notice: Subject to any disclaimer, the term of this patent is extended or adjusted under 35 U.S.C. 154(b) by 0 days.

(21) Appl. No.: 11/080,787

(22) Filed: Mar. 15, 2005

(51) Int. Cl.
*B63B 1/00* (2006.01)

(52) U.S. Cl. .................................. 114/56.1; 114/39.25

(58) Field of Classification Search ............. 114/39.25, 114/56.1, 248, 258
See application file for complete search history.

(56) References Cited

U.S. PATENT DOCUMENTS

| | | | | |
|---|---|---|---|---|
| 5,002,004 A | * | 3/1991 | Kunitake et al. | 114/274 |
| 5,184,564 A | * | 2/1993 | Robbins et al. | 114/345 |
| 5,443,028 A | * | 8/1995 | Keen | 114/248 |
| 5,570,649 A | * | 11/1996 | Austin | 114/61.2 |
| 5,570,650 A | * | 11/1996 | Harley | 114/61.2 |
| 5,619,944 A | * | 4/1997 | Baker | 114/61.1 |
| 5,660,131 A | * | 8/1997 | Gulling et al. | 114/40 |
| 5,988,088 A | * | 11/1999 | Ishida et al. | 114/66 |
| 6,135,047 A | * | 10/2000 | Miller | 114/343 |

* cited by examiner

*Primary Examiner*—Stephen Avila
(74) *Attorney, Agent, or Firm*—Edward P. Dutkiewicz

(57) ABSTRACT

A hull is formed of a forward section, a rearward section and intermediate sections there between. The forward section is in a generally triangular configuration. The forward section has a forward-most point. The forward section has rearwardly extending sides. The rearward sections are formed of exterior and interior walls. A space is provided between the interior and exterior walls. The intermediate sections are formed in a generally triangular configuration. The intermediate section have a forward-most point. The intermediate sections have rearwardly extending interior walls and laterally spaced exterior walls. A saloon is above water level and is secured to the top and interior walls of the hull. The saloon has a front at the rearward end of the intermediate section. The saloon has a rear spaced forward of the end of the unitary hull.

8 Claims, 6 Drawing Sheets

FIG 9
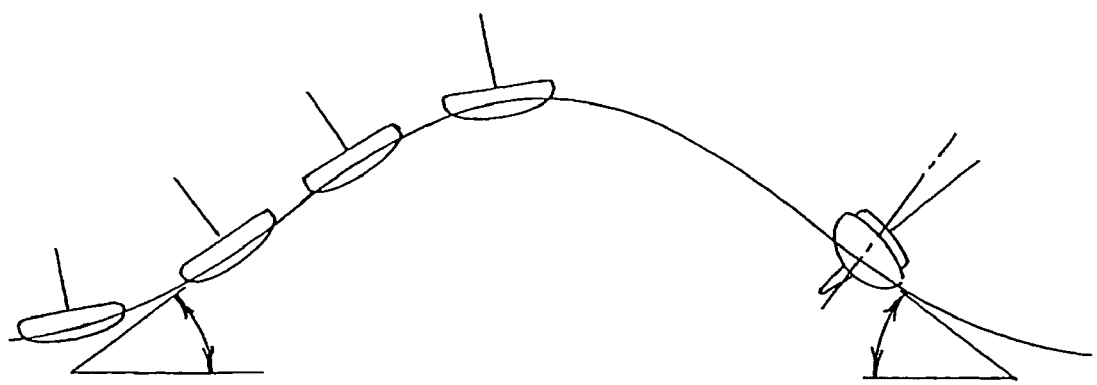
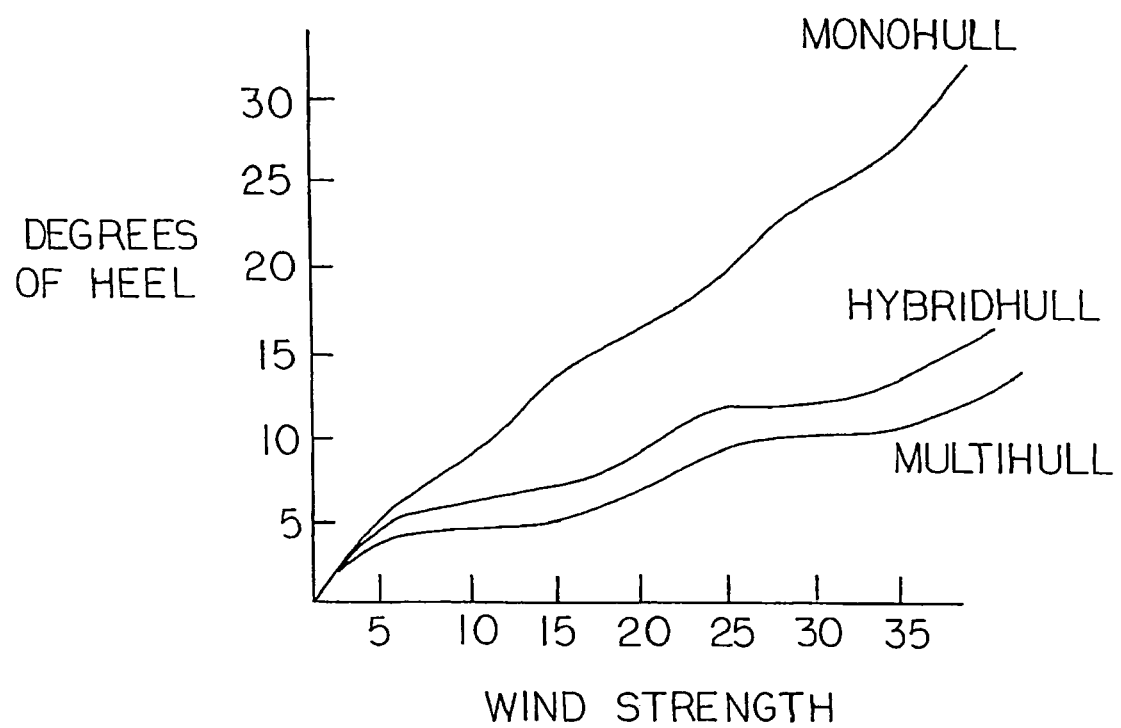
FIG 10

HYBRIDHULL BOAT SYSTEM

BACKGROUND OF THE INVENTION

1. Field of the Invention

The present invention relates to a hybridhull boat system and more particularly pertains to increasing boating performance capabilities while decreasing drag during operations and use.

2. Description of the Prior Art

The use of boat systems of known designs and configurations is known in the prior art. More specifically, boat systems of known designs and configurations previously devised and utilized for the purpose of transporting users over water through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,373,715 issued Mar. 19, 1968 to Stacey relates to a powered trimaran with retractable pontoons. U.S. Pat. No. 4,644,890 issued Feb. 24, 1987 to Lott relates to a trimaran with planing hull. Lastly, U.S. Pat. No. 5,184,564 issued Feb. 9, 1993 to Robbins relates to a boat for personal watercraft.

While these devices fulfill their respective, particular objectives and requirements, the aforementioned patents do not describe hybridhull boat system that allows increasing boating performance capabilities while decreasing drag during operations and use.

In this respect, the hybridhull boat system according to the present invention substantially departs from the conventional concepts and designs of the prior art, and in doing so provides an apparatus primarily developed for the purpose of increasing boating performance capabilities while decreasing drag during operations and use.

Therefore, it can be appreciated that there exists a continuing need for a new and improved hybridhull boat system which can be used for increasing boating performance capabilities while decreasing drag during operations and use. In this regard, the present invention substantially fulfills this need.

SUMMARY OF THE INVENTION

In view of the foregoing disadvantages inherent in the known types of boat systems of known designs and configurations now present in the prior art, the present invention provides an improved hybridhull boat system. As such, the general purpose of the present invention, which will be described subsequently in greater detail, is to provide a new and improved hybridhull boat system and method which has all the advantages of the prior art and none of the disadvantages.

To attain this, the present invention essentially comprises a rigid unitary hull. The unitary hull has a top. The top is positionable above water. The unitary hull has a bottom. The bottom is positionable beneath water. The unitary hull has a front end and a rear end. The unitary hull has a central axis. The central axis is provided between the front end and the rear ends. The unitary hull has a forward section. The forward section is provided forwardly. The unitary hull has a rearward sections. The rearward section is provided rearwardly. The unitary hull has an intermediate section. The intermediate section is provided between the forward and the rearward sections. The unitary hull is symmetrically constructed about the central axis.

The forward section is provided in a generally triangular configuration. The forward section has a forward-most point. The forward section has rearwardly extending convex sides.

The rearward sections are formed of laterally exterior walls. The rearward section are further formed of laterally interior walls. A space is provided between the exterior and interior walls.

The intermediate sections are formed in a generally triangular configuration. The intermediate sections have a forward-most point. The intermediate sections have rearwardly extending interior walls. The interior walls continue smoothly into the interior walls of the rearward sections. The interior sections have laterally spaced exterior walls. The interior walls continue smoothly from the exterior walls of the forward section. The interior walls further continue smoothly into the exterior walls of the rearward sections whereby the interior walls and the exterior walls are spaced at increasingly greater distances when viewed from the front to the back of the hull.

Further provided is a saloon above the water level. The saloon and the hull interior, inside, receives and supports crew and passengers during operation and use. The saloon is secured to the interior walls and top of the unitary hull. The saloon has a front. The front of the saloon is provided at the rearward end of the intermediate section. The saloon has a rear. The rear of the saloon is spaced forward of the end of the unitary hull. This thus forms a generally triangular opening in the hull in front of the saloon and a generally rectangular opening in the hull behind the saloon Provided last is a mast. The mast extends upwardly from the saloon. The mast receives the sails.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hybridhull boat system which has all of the advantages of the prior art boat systems of known designs and configurations and none of the disadvantages.

It is another object of the present invention to provide a new and improved hybridhull boat system which may be easily and efficiently manufactured and marketed.

It is further object of the present invention to provide a new and improved hybridhull boat system which is of durable and reliable constructions.

An even further object of the present invention is to provide a new and improved hybridhull boat system which is susceptible of a low cost of manufacture with regard to both materials and labor, and which accordingly is then susceptible of low prices of sale to the consuming public, thereby making such hybridhull boat system economically available to the buying public.

Even still another object of the present invention is to provide a hybridhull boat system for increasing boating performance capabilities while decreasing drag during operations and use.

Lastly, it is an object of the present invention to provide a new and improved hybridhull boat system. A hull is formed of a forward section, a rearward section and intermediate sections there between. The forward section is in a generally triangular configuration. The forward section has a forward-most point. The forward section has rearwardly extending sides. The rearward sections are formed of exterior and interior walls. A space is provided between the interior and exterior walls. The intermediate sections are formed in a generally triangular configuration. The intermediate section have a forward-most point. The intermediate sections have rearwardly extending interior walls and laterally spaced exterior walls. A saloon is secured to the top of the hull. The saloon has a front at the rearward end of the intermediate section. The saloon has a rear spaced forward of the end of the unitary hull.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 9 is a front elevational view illustrating a hybrid hull boat constructed in accordance with the present invention and a monohull boat on a wave slope.

FIG. 10 is a graph illustrating the wind strength against the degrees of heel for various hull designs.

The same reference numerals, as used herein, refer to the same parts throughout the various Figures and throughout the various primary and alternate embodiments of the present invention.

DESCRIPTION OF THE PREFERRED EMBODIMENT

Figure 1:
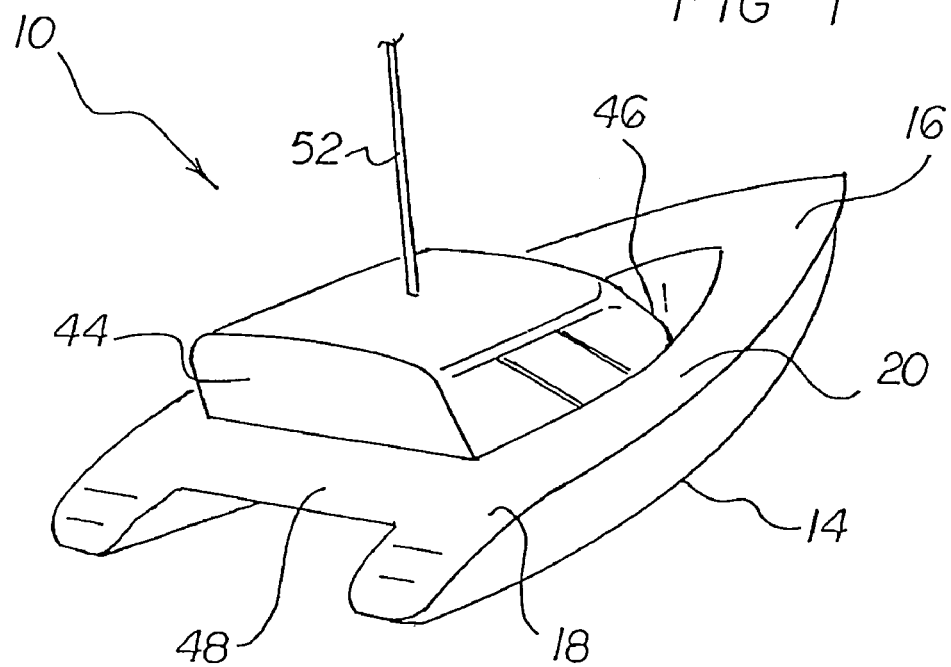
FIG. 1 is a hybridhull boat system constructed in accordance with the principles of the present invention.

With reference now to the drawings, and in particular to FIG. 1 thereof, the preferred embodiment of the new and improved hybridhull boat system embodying the principles and concepts of the present invention and generally designated by the reference numeral 10 will be described.

The present invention, the hybridhull boat system 10 is comprised of a plurality of components. Such components in their broadest context include a hull and a saloon. Such components are individually configured and correlated with respect to each other so as to attain the desired objective.

First provided is a rigid unitary hull 14. The unitary hull has a top. The top is positionable above water. The unitary hull has a bottom. The bottom is positionable beneath water. The unitary hull has a front end and a rear end and. The unitary hull has a central axis. The central axis is provided between the front end and the rear ends. The unitary hull has a forward section 16. The forward section is provided forwardly. The unitary hull has a rearward sections 18. The rearward section is provided rearwardly. The unitary hull has an intermediate section 20. The intermediate section is provided between the forward and the rearward sections. The unitary hull is symmetrically constructed about the central axis.

The forward section is provided in a generally triangular configuration. The forward section has a forward-most point 24. The forward section has rearwardly extending convex sides 26.

The rearward sections are formed of laterally exterior walls 30. The rearward section are further formed of laterally interior walls 32. A space is provided between the exterior and interior walls.

Figure 4:
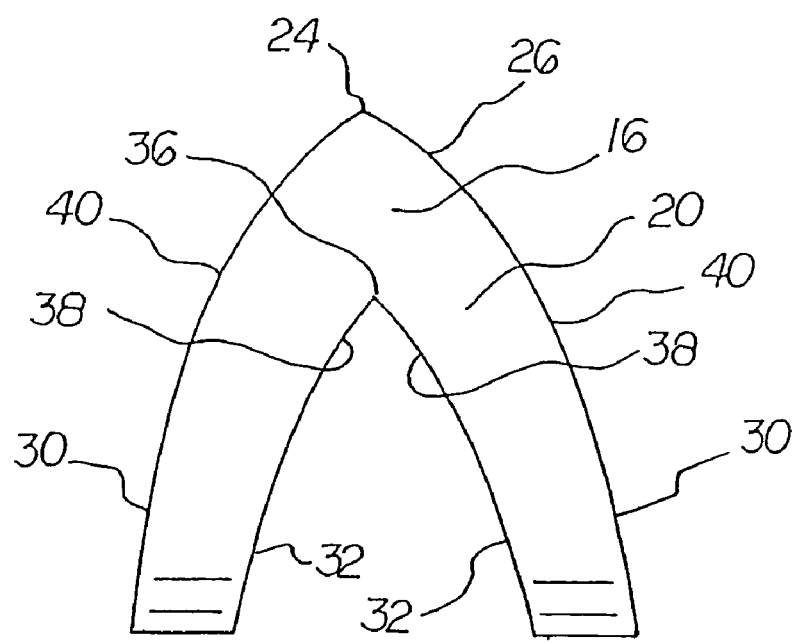
FIG. 4 is a plan view of a hybrid hull with the saloon removed illustrating the preferred embodiment of the present invention.
Figure 5:
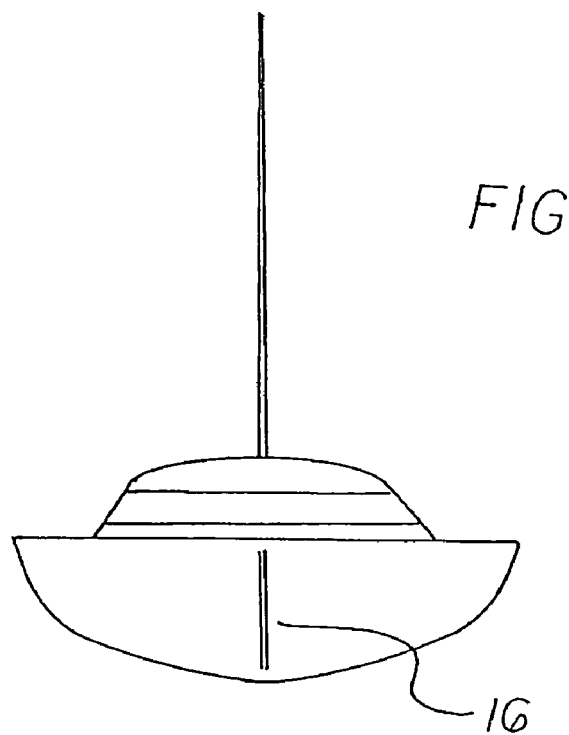
FIG. 5 is a front elevational view of the preferred embodiment of the invention.
Figure 6A:
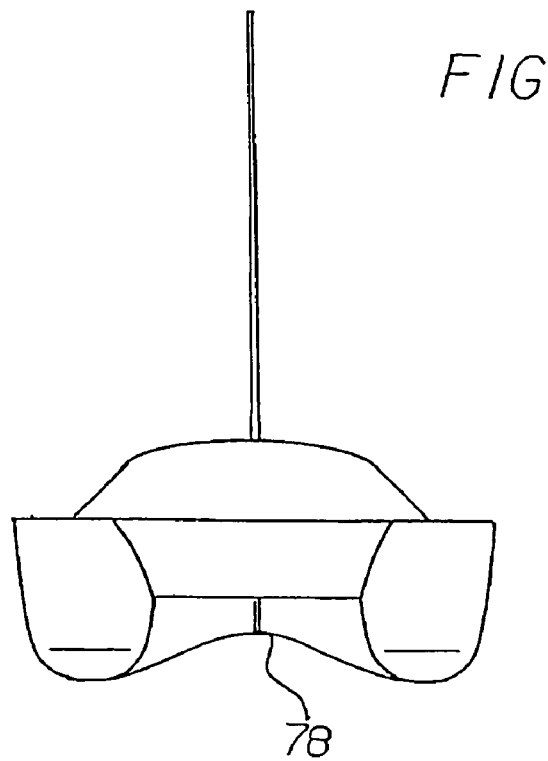
FIG. 6A is a rear elevational view of the preferred embodiment of the invention.
Figure 6B:
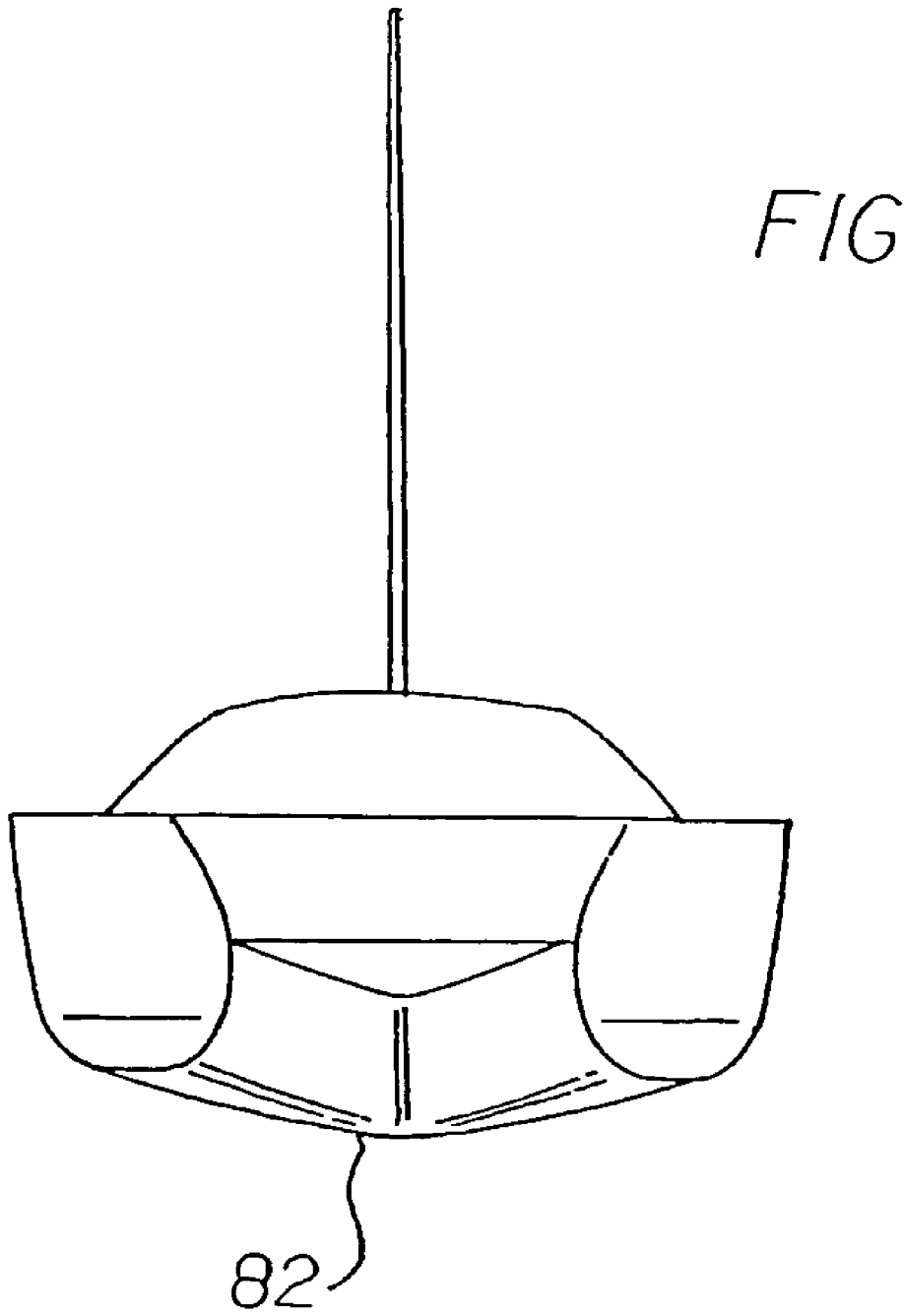
FIG. 6B is a rear elevational view of the FIG. 2 embodiment of the invention.
Figure 7:
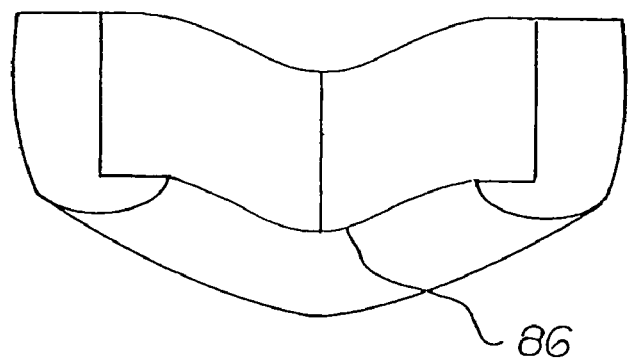
FIG. 7 is a rear elevational view of the FIG. 3 embodiment of the invention.

The intermediate sections are formed in a generally triangular configuration. The intermediate sections have a forward-most point 36. The intermediate sections have rearwardly extending interior walls 38. The interior walls continue smoothly into the interior walls of the rearward sections. The interior sections have laterally spaced exterior walls 40. The interior walls continue smoothly from the exterior walls of the forward section. The interior walls further continue smoothly into the exterior walls of the rearward sections. The interior walls and the exterior walls are spaced at increasingly greater distances when viewed from the front to the back of the hull. Note FIG. 4.

Further provided is a saloon 44 positioned above the water level. The saloon and hull interior, inside, receives and supports crew and passengers during operation and use. The saloon is secured to the interior walls and top of the unitary hull. The saloon has a front 46. The front of the saloon is provided at the rearward end of the intermediate section. The saloon has a rear 48. The rear of the saloon is spaced forward of the end of the unitary hull. This thus forms a generally triangular opening in the hull below, at and above the water level, and further above the water level, a generally trianglar opening in the hull in front of the saloon and a generally rectangular opening in the hull behind the saloon.

Provided last is a mast 52. The mast extends upwardly from the saloon. The mast receives the sails. It should be understood that the hull of the present invention is adapted for use with any type of boat or watercraft, with or without sails.

Figure 2:
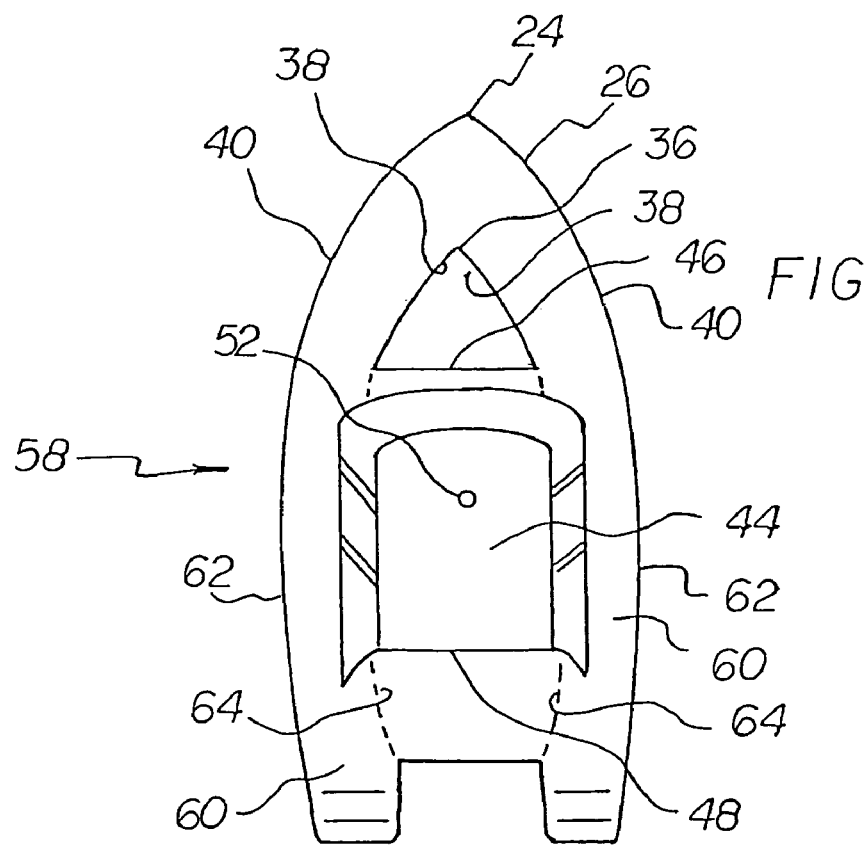
FIG. 2 is a plan view of one embodiment of a hybridhull boat system of the present invention.

An alternate embodiment of the present invention is shown in FIG. 2. In this embodiment the rearward sections 60 are generally C-shaped. The sides of the forward section and the exterior walls of the intermediate and rearward sections 40, 62 form smooth continuous convex curves. The interior walls of the intermediate and rearward sections 38, 64 form smooth continuous convex curves. The exterior and interior walls are a greater distance at an intermediate region than adjacent to the front end and adjacent to the rear end.

Figure 3:
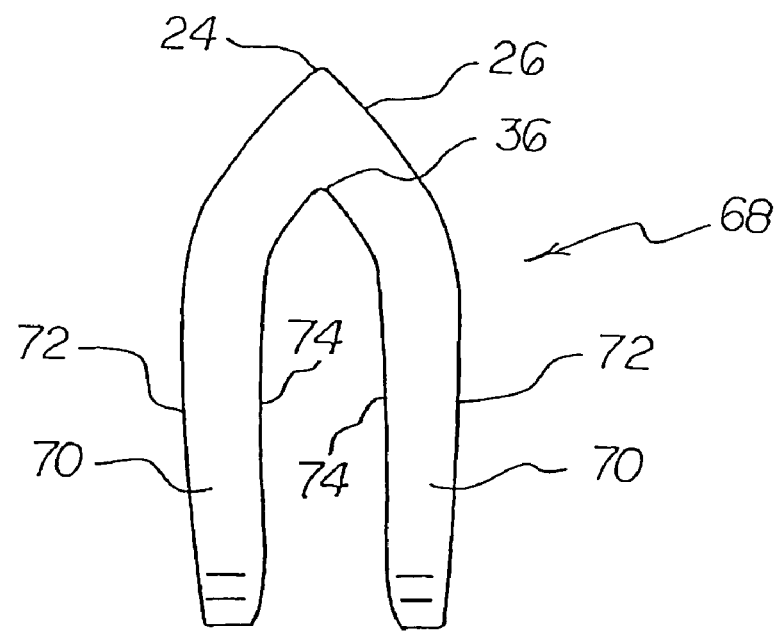
FIG. 3 is a plan view of a hybrid hull with the saloon removed illustrating another embodiment of the present invention.

Another alternate embodiment of the present invention is shown in FIG. 3. In this embodiment the rearward sections 70 are generally linearly shaped. The exterior walls and the interior walls of the rearward sections 72 74 form essentially straight lines. The exterior and interior walls are generally parallel from adjacent to the front end to adjacent to the rear end.

From the descriptions above, it should be understood that the present invention includes a wishbone or v-shaped hull for sailboats and other watercraft, formed by a single hull or by joining two or more hulls, consisting of a single leading edge bow and a prominent, full vertical division or splitting of the hull or hulls that originates forward of midship or at midship and continues aft to form two sterns, two transoms.

Through this new design, a combination of corresponding counterbalancing qualities are altered which improve vessel performance and seaworthiness.

One purpose of this invention is to provide benefits and advancements over current art including a new superior type of hull for sailboats and other watercraft that avoids certain significant challenges of traditional multihull and monohull sailboats. Such challenges include, specifically, the windward ability of multihulls and the heeling and space constrains of monohulls. An additional benefit that comes from the new design is greater speed due to reduced wetted surface area.

Windward ability, the ability to sail close to the apparent wind, is an important measure of vessel seaworthiness. Greater windward ability enables a vessel to complete tacks through fewer degrees of turn, which saves times by eliminating otherwise necessary wide deviations from windward courses. This is critical in avoiding dangers to leeward and provides greater overall flexibility in determining courses of sail, making available narrow passages to windward for example.

Despite its importance, windward ability is an area of traditionally poor performance in multihull sailboats due to the high aerodynamic drag of the hulls. The invention, with its single bow design minimizes the aerodynamic drag of the hull, parasitic drag of the windage of the hull, and provides greater windward ability.

Figure 8:
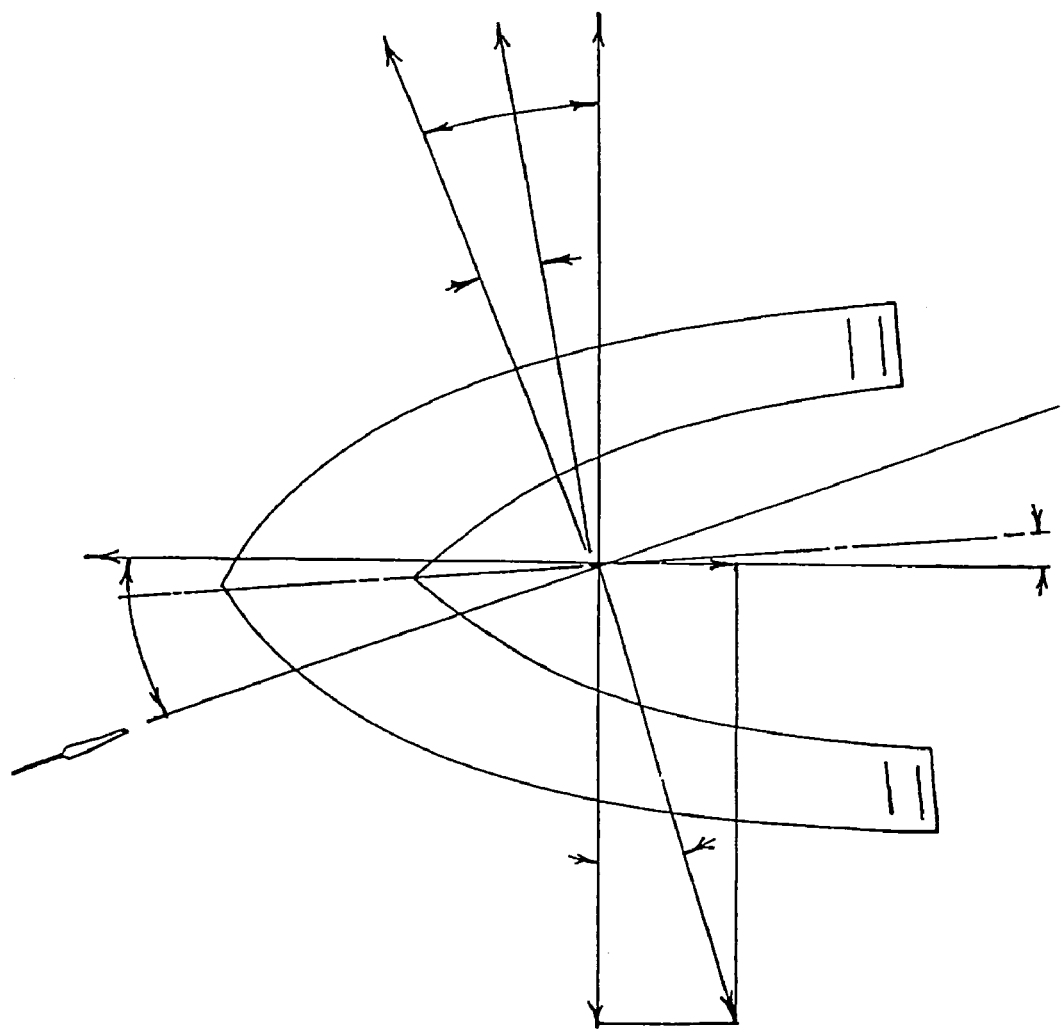
FIG. 8 is a plan view illustrating the forces on a sailing yacht.

FIG. 8 depicts the resulting narrower apparent wind angle which is the angle between the apparent wind and the course sailed/driving force and is equal to the angle between the cross wind force and the healing force, a portion of which is composed of the aerodynamic drag angle.

In FIG. 8, a horizontal line extends through the centerline of the hull. Rotated clockwise is the course sailed/driving force to the left and the resistance to the right. Rotated counter-clockwise is the apparent wind to the left and the drag to the right. Perpendicular to the centerline is the side force below and the heeling force above. Perpendicular to the apparent wind and drag is the resultant hydrodynamic force below to the right of the side force and the aerodynamic side force above to the left of the heeling force. The cross wind force appears to the left of the aerodynamic side force.

Wetted surface area is a major contributing factor to a the frictional resistance of a hull. By fusing the inner or facing portions of the bow, the bow design of the present invention reduces the wetted surface area of the hull. This reduction in wetted surface is directly proportional, linearly correlated, to the reduction in total frictional resistance.

In the case of sailboats, all resistance has to be balanced by a driving force from the sails. So by lowering resistance, speed is increased or the same speed could be achieved with less energy, i.e. smaller sail area.

Furthermore, the invention reduces the wetted surface area while still maintaining a relatively small wet beam area so as to not nullify the benefits of reduced wetted surface area by generating significantly increased residuary or primarily wave resistance.

Crew and/or passenger comfort is an important consideration not only in order to provide a more pleasant voyage but also to avoid fatigue due to extreme motion that could result in exhaustion or errors of judgment.

In configuring a hybridhull vessel, it is critical to the seaworthiness of the vessel to distribute the weight as far from the center of the gravity as possible. This can be achieved via a wide beam with prominent, full vertical separation of hull or hulls occurring forward of mid ship, large accommodations in the hull or hulls and a relatively light weight saloon. This is crucial for a desirable righting moment, the inbuilt static resistance of the vessel to heeling. Furthermore, by concentrating the weight of the vessel and the center of buoyancy, the center of gravity of the volume of water displaced by the hull or hulls at the extremities of the beam, damping is increased which helps prevent rotational energy from being generated especially that sufficient to capsize the vessel.

As depicted in FIG. 9, the hybridhull, illustrated on the left, follows the slope of the wave like a raft as compared to prior art monohull vessels, on the right. Yet, because the weight and buoyancy of the vessel is concentrated primarily in the extremities of the beam, hybridhull vessels and multihulls will be more stable against rolling. While monohulls use heavy, weighted keels suspended under water to keep the boat upright, relying on the force of gravity to keep the keel submerged and prevent capsize. Although this approach is relatively effective in preventing capsize, it does subject the crew and passengers to sometimes severe angels of heel, as shown in FIGS. 9 and 10.

The graph in FIG. 10 shows the relative difference between monohull, multihull and hybridhull heeling degrees.

Technological advances and economic changes precipitated the present invention. Monohull and multihull sailing vessels were developed separately, over time and vast geographical distances apart to serve the specific needs of sailors in their respective locations with the materials available. Modern structural design and manufacturing techniques, such as computer aided design and simulators, along with the enhanced strength of modern materials, make production of the hybridhull more feasible today than in the past. By analyzing the hull stress and loads and distributing construction materials accordingly, more at high stress points, such as the single bow, and less at low ones, the weight of the hull can be minimized and strength increased, via reduction of both the loads that the hull experiences and stress concentrations. Prior manufacturing practices and material would make development of a structurally sound and seaworthy hybridhull considerably more difficult.

Also, over the past several years sailing, and cruising specifically, has become more affordable and has been adopted by a larger segment of the population, including families and vacationers. The invention satisfies their needs by providing a safe stable and spacious leisure environment.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new and desired by Letters Patent of the United States is as follows:

1. A hybridhull boat system comprising:
    a hull formed of a forward section and rearward sections and intermediate sections there between, the forward section being in a generally triangular configuration with a forward-most point with rearwardly extending sides, the rearward sections being formed of exterior and interior walls with a space there between, the intermediate sections being formed in a generally triangular configuration with a forward-most point with rearwardly extending interior walls and with laterally spaced exterior walls; and
    a saloon secured to the top of the hull, the saloon having a front at the rearward end of the intermediate section and a rear spaced forward of the end of the unitary hull.

2. The system as set forth in claim 1 wherein the rearward sections are generally wishbone shaped with the sides of the forward section and the exterior walls of the intermediate and rearward sections forming smooth continuous convex curves and the interior walls of the intermediate and rearward sections forming smooth continuous convex curves with the exterior and interior walls being increasingly spaced from the rear of the hull to adjacent to the front of the hull while the space between the interior walls being increasingly spaced from adjacent to the front of the hull to the rear of the hull.

3. The system as set forth in claim 1 wherein rearward sections are generally C-shaped with the sides of the forward section and the exterior walls of the intermediate and rearward sections forming smooth continuous convex curves and the interior walls of the intermediate and rearward sections forming smooth continuous convex curves with the exterior and interior walls being a greater distance an intermediate region than adjacent to the front end and adjacent to the rear end.

4. The system as set forth in claim 1 wherein rearward sections are generally linearly shaped with the exterior walls and the interior walls of the rearward sections forming essentially straight lines with the exterior and interior walls being generally parallel from adjacent to the front end to adjacent to the rear end.

5. The system as set forth in claim 1 wherein the hull at rearward end extends to a higher elevation than at the forward end.

6. The system as set forth in claim 1 wherein the hull at forward end extends to a lower elevation than at the rearward end.

7. The system as set forth in claim 1 wherein the hull at forward end extends to a lower elevation than at the rearward end and the saloon extends to a lower elevation than the rearward sections.

8. A hybridhull boat system for increasing boating performance capabilities while decreasing drag during operation and use comprising, in combination:
    a rigid unitary hull with a top positionable above water and a bottom positionable beneath water and with a front end and a rear end and with a central axis between the front end and the rear end, the unitary hull being formed of a forward section forwardly and rearward sections rearwardly and intermediate sections between the forward section and the rearward sections, the unitary hull being symmetrically constructed about the central axis;
    the forward section being in a generally triangular configuration with a forward-most point with rearwardly extending convex sides;
    the rearward sections being formed of laterally exterior walls and laterally interior walls with a space there between;
    the intermediate sections being formed in a generally triangular configuration with a forward-most point with rearwardly extending interior walls continuing smoothly into the interior walls of the rearward sections and with laterally spaced exterior walls continuing smoothly from the exterior walls of the forward section and also continuing smoothly into the exterior walls of the rearward sections whereby the interior walls and the exterior walls are spaced at increasingly greater distances when viewed from the front to the back of the hull;
    a saloon above water level and hull interior, inside, for receipt and support of crew and passengers during operation and use, the saloon being secured to the interior walls and top of the unitary hull, the saloon having a front at the rearward end of the intermediate section and a rear spaced forward of the end of the unitary hull thereby forming a generally triangular opening in the hull in front of the saloon and a generally rectangular opening in the hull behind the saloon; and
    a mast extending upwardly from the saloon for the receipt of sails.

* * * * *